United States Patent [19]
Bessels

[11] Patent Number: 5,680,922
[45] Date of Patent: Oct. 28, 1997

[54] APPARATUS FOR ORIENTING LIDS

[75] Inventor: Nicolaas Bessels, Twello, Netherlands

[73] Assignee: Thomassen & Drijver-Verblifa N.V., Deventer, Netherlands

[21] Appl. No.: 520,308

[22] Filed: Aug. 28, 1995

[30] Foreign Application Priority Data

Aug. 31, 1994 [NL] Netherlands ............ 9401416

[51] Int. Cl.$^6$ .................................................. B65G 47/24
[52] U.S. Cl. .................... 198/398; 198/396; 198/690.1
[58] Field of Search ................................ 198/396, 398, 198/399, 400, 619, 689.1, 690.1

[56] References Cited

U.S. PATENT DOCUMENTS

| 3,285,387 | 11/1966 | Ochs ................................ 198/396 |
| 3,565,234 | 2/1971 | Birdsong ...................... 198/396 X |
| 3,642,118 | 2/1972 | Kornylak ..................... 198/690.1 |
| 3,924,732 | 12/1975 | Leonard ....................... 198/398 X |
| 4,146,467 | 3/1979 | Sauer et al. ................. 198/398 X |
| 4,235,187 | 11/1980 | Mirza ............................... 198/380 |
| 4,735,343 | 4/1988 | Herzog ........................ 198/398 X |
| 5,197,584 | 3/1993 | Powell et al. .................. 118/58 |

FOREIGN PATENT DOCUMENTS

| 2349518 | 11/1977 | France . |
| 2133193 | 8/1983 | United Kingdom . |
| 2146967 | 5/1985 | United Kingdom ............... 198/690.1 |

OTHER PUBLICATIONS

Dutch Patent Office Search Report for Dutch Application No. 9401416.

*Primary Examiner*—James R. Bidwell
*Attorney, Agent, or Firm*—Lockwood, Alex, FitzGibbon & Cummings

[57] ABSTRACT

An apparatus for orienting lids each having a plate and a peripheral edge standing away therefrom, the apparatus including a first conveyor belt, moving in a first direction, for supplying a disordered mass of lids and a second conveyor belt connecting thereto at an end thereof being positioned in a partially overlying relation to the first conveyor belt forming an acute angle therebetween and the second conveyor belt moving in a second direction opposite in relation to the first direction. The second conveyor belt having a front surface and a back surface wherein an attracting device producing an attractive force is placed close to the back surface such that a sufficient attractive force is exerted on a plate of a lid when the plate is in contact with the front surface of the second conveyor belt to cause the lid to be carried on the second conveyor belt in a proper orientation, and wherein the attractive force is insufficient to carry the lid on the second conveyor belt when the peripheral edge of the lid is in contact with the front surface of the second conveyor belt such that non-properly oriented lids fall onto the first conveyor belt for further re-orientation. The apparatus also including a discharge device for removing the lids from the second conveyor belt and further transporting the lids having the proper orientation.

20 Claims, 2 Drawing Sheets

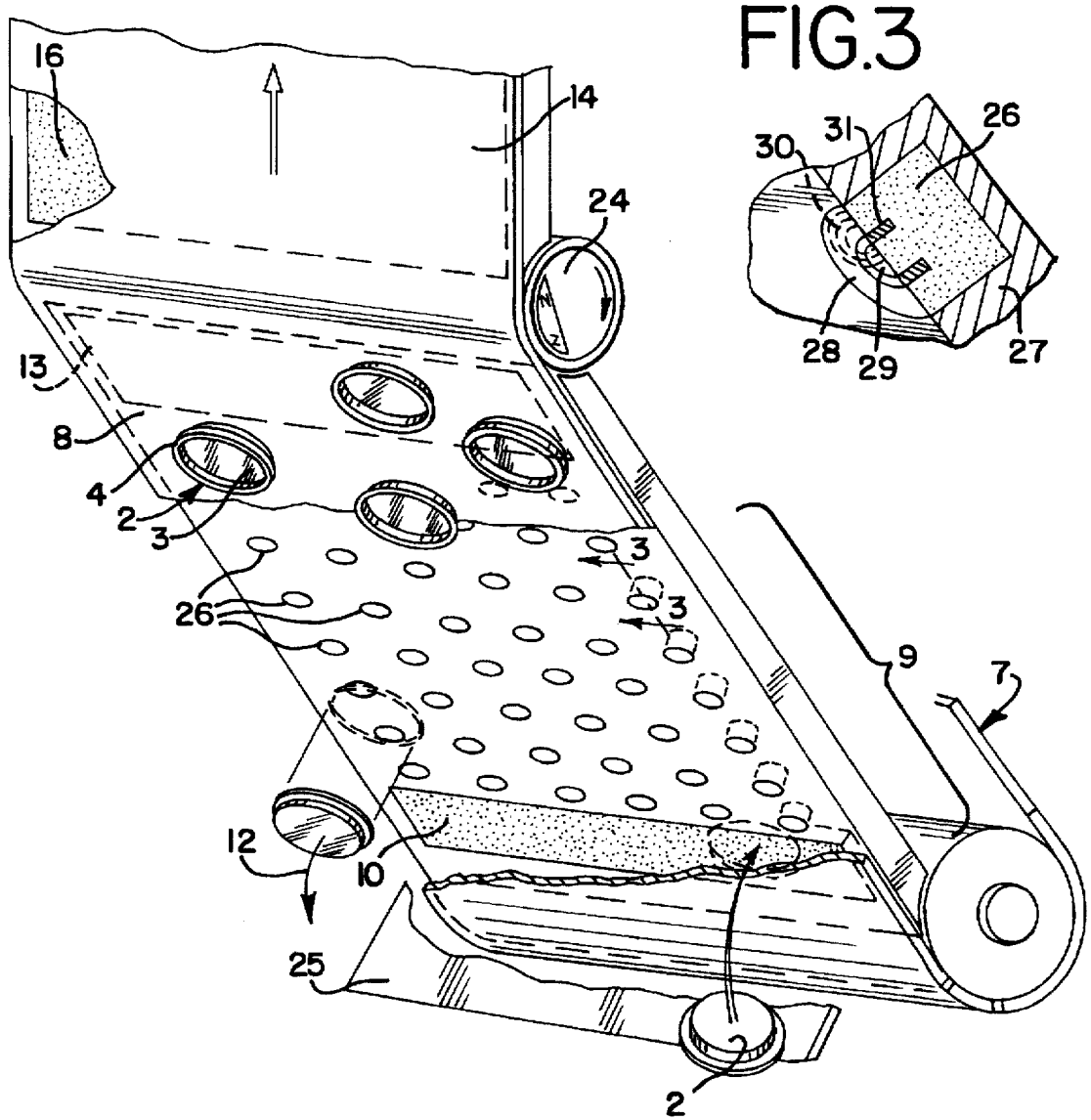

APPARATUS FOR ORIENTING LIDS

In order to arrange lids on cans, supplied lids must all have the same orientation.

It is known to supply lids in a row, to transport these lids past an orientation detection station and to eject wrongly oriented lids.

The object of the invention is to provide an apparatus which enables a very high handling speed.

In respect of this objective the invention generally provides an apparatus for orienting lids each comprising a plate and a peripheral edge standing away therefrom, which apparatus comprises:

(1) a first conveyor belt for supplying a disordered mass of lids;

(2) a second conveyor belt connecting thereto at the end thereof and inclining upward at an acute angle of between about 20° and 80°, preferably between about 40° and 50°, behind the active part of which are placed attracting means which exert a sufficiently great attractive force on the plate to cause a lid to be carried along by the second conveyor belt but which exert an attractive force on the peripheral edge insufficiently great to cause a lid to be carried along by the second conveyor belt; and (3) discharge means for removing from the second conveyor belt and further transporting the lids all with the same orientation.

The apparatus can for instance be embodied such that the attracting means are underpressure means which can draw up the lids via holes in the second conveyor belt.

In another embodiment the apparatus has the special feature that the attracting means are magnetic means and the lids are ferromagnetic.

In order to ensure an easy and reliable transfer of the lids from the first conveyor belt to the second conveyor belt, the latter mentioned apparatus can have the special feature that at the in-feed end of the second conveyor belt is situated a magnetic plate extending over the whole width of this second conveyor belt and having a strength such that all lids, irrespective of their orientation, are attracted thereby and carried along by the second conveyor belt.

In a particular embodiment the apparatus can for instance have the special feature that the magnetic means comprise a pattern of magnets placed at regular mutual distances.

In preference the apparatus is embodied such that the magnets are embodied such that they generate a magnetic field displaying a strong attenuation with the distance to the magnet. Such a magnetic field has a steep gradient perpendicular to the main plane of the conveyor belt. The thus obtained flat or shallow form of the magnetic field results in lids which rest with the plate against the second conveyor belt being attracted while lids with reverse orientation have a distance between their plate and the magnets such that they drop downward.

In a specific embodiment the apparatus has the characteristic that the surfaces of adjoining magnets facing toward the second conveyor belt have opposing orientations. A relatively flat magnetic field is hereby realized.

In a specific embodiment this variant has the special feature that on their end remote from the second conveyor belt the magnets are coupled to a common ferromagnetic pole plate.

In another embodiment the apparatus has the special feature that the magnets are substantially U-shaped in cross section.

In yet another embodiment the apparatus displays the special feature that the magnets are substantially W-shaped in cross section, wherein the middle leg has magnetic orientation opposed to the magnetic orientation of the outer legs.

This latter variant can have the special feature that the active end face of the magnet has a generally annular magnet pole enclosing a central magnet pole. Very good results are obtained with an apparatus in which the magnetic means comprise a pattern of magnets placed at regular mutual distances which displays the special feature that the mutual distances between the magnets are smaller than the relevant linear dimension of a lid, for instance in the case of round lids, the diameter.

The invention will now be elucidated with reference to the annexed drawing. Herein:

FIG. 2 shows on enlarged scale the detail II of FIG. 1;

FIG. 3 shows the cross section III—III of FIG. 2; and

FIG. 4 shows a partly broken away perspective view of other magnetic means.

Figure 1:
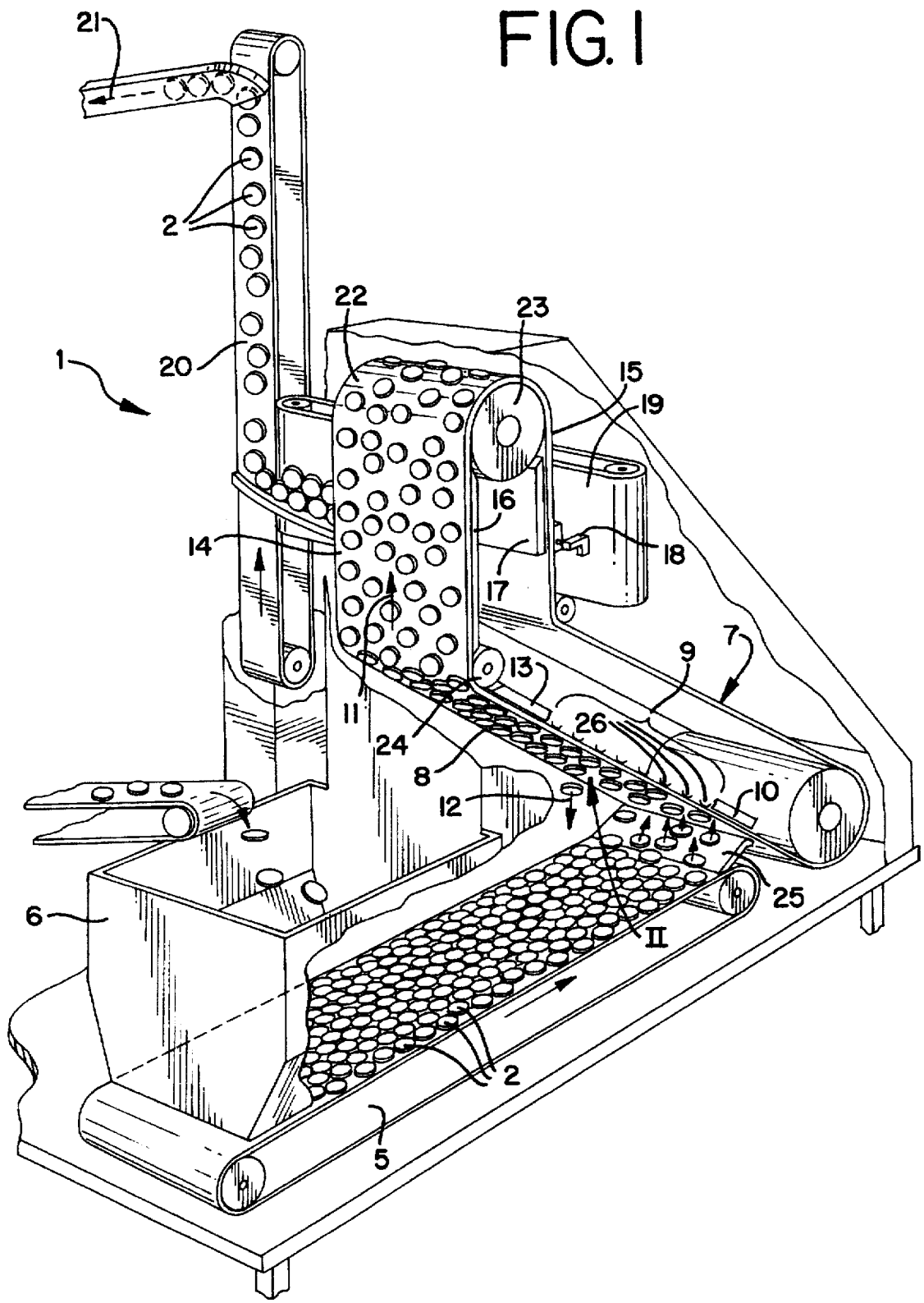
FIG. 1 shows a partly broken away perspective view of an apparatus according to the invention.

FIG. 1 shows an apparatus 1 for orienting lids 2 each comprising a plate 3 and a peripheral edge 4 standing away therefrom (see FIG. 2). The apparatus 1 comprises a first conveyor belt 5 for feeding lids 2 poured thereon via a hopper 6, a second conveyor belt 7 connecting onto this first conveyor belt 5 at the end thereof and inclining upward at an acute angle of about 45°, behind the active part 8 of which are placed magnet means 9 which exert a sufficiently great attractive force on the plate 3 to cause a lid 2 to be carried along by the second conveyor belt 7 but which exert an attractive force on the peripheral edge 4 insufficiently great to cause a lid 2 to be carried along by the second conveyor belt 7; in addition to discharge means to be described hereinbelow for removing from the second conveyor belt 7 and further transporting the oriented lids 2 all with the same orientation.

The lids 2 are supplied in disordered manner onto the first conveyor belt. At the end thereof they are attracted by a strong magnet 10 which extends over the full width of the second conveyor belt 7 and which has a certain length in the relevant transporting direction designated with the arrow 11. Due to the attraction by the magnet and the movement 11 of the second conveyor belt 7 all lids 2 are carried along, irrespective of their orientation. After leaving the zone being influenced by the magnet 10 the lids enter a zone under the influence of magnetic means 9, the basic properties of which have already been described. Lids resting with the plate on the second conveyor belt 7 are attracted by the magnetic means 9 with a force such that they are carried along by conveyor belt 7. Lids 2 with a reverse orientation, which thus rest with their peripheral edge 4 on the active part 8 of the second conveyor belt, are attracted to an insufficient degree by the magnetic means 9 to be further transported thereby. They therefore fall downward as according to arrow 12 and drop again onto the first conveyor belt 5, once again to undergo the orientation selection process.

At the end of the active part 8 of the second conveyor belt 7 is situated a second strong magnet 13 which attracts all lids 2 carried along by the second conveyor belt 7 to be further taken over by parts 14 and 15 extending substantially vertically upward and downward respectively, behind which are disposed respective strong magnets 16 and 17. The straight active parts 14 and 15 are separated by a semicylindrical part 22 which is defined by a magnetic roller 23. Placed at the end of the active part 15 is a scraper surface 18 which extends obliquely downward and adjoins a discharge conveyor belt 19 which transfers the oriented lids to a magnetic end conveyor belt 20 which finally transfers the oriented lids 2 further transported thereby to a discharge chute 21.

A roller 24 is situated between the active parts 8 and 14. This can also be magnetic if required.

Attention is drawn to the fact that a riser plate 25 is situated on the end of conveyor belt 5.

No drive means are shown in the drawing. These may be of any suitable accepted type.

FIG. 2 shows that the magnetic means 9 comprise a pattern of magnets 26 placed at regular mutual distances.

FIG. 3 shows such a magnet 26. This is embedded into a non-ferromagnetic plate 27, has a generally W-shape in cross section, wherein the active end surface 28 of magnet 26 has a generally annular magnet pole 30 enclosing a central magnet pole 29. The two magnet poles 29 and 30 are mutually separated by a cylindrical filler mass 31, for instance of plastic or copper. Magnet 26 has a very "shallow" magnetic field.

FIG. 4 shows another configuration in which the active surfaces 32 of adjoining magnets 33 facing toward the second conveyor belt 7 have opposing orientations. Magnets 33 are rod-shaped and coupled on their end remote from the second conveyor belt 7 to a common ferromagnetic pole plate 34.

As FIG. 2 shows, the mutual distances between the magnets 26 applied in this configuration are smaller than the diameter of the round lids 2. For clarity, rows of magnets with respectively north poles and south poles located in vertical planes are designated respectively with black and white circles.

I claim:

1. An apparatus for orienting lids each comprising a plate and a peripheral edge standing away therefrom, which apparatus comprises:

a first conveyor belt, moving in a first direction, for supplying a disordered mass of lids;

a second conveyor belt positioned in partially overlying relation to said first conveyor belt forming an acute angle therebetween and said second conveyor belt moving in a second direction opposite to said first direction;

a riser plate being positioned in proximity to an end of said first conveyor belt for transferring said disordered lids to said second conveyor belt;

said second conveyor belt having a front surface and a back surface wherein an attracting means producing an attractive force is placed close to said back surface such that a sufficient attractive force is exerted on a plate of a lid when said plate is in contact with said front surface of said second conveyor belt to cause the lid to be carried on the second conveyor belt in a proper orientation, and wherein said attractive force is insufficient to carry the lid on said second conveyor belt when the peripheral edge of the lid is in contact with said front surface of said second conveyor belt such that non-properly oriented lids fall onto said first conveyor belt for further re-orientation; and discharge means for removing the lids from the second conveyor belt and further transporting the lids having the proper orientation.

2. Apparatus as claimed in claim 1, wherein the attracting means are air suction means which can draw up the lids via holes in the second conveyor belt.

3. Apparatus as claimed in claim 1, wherein the attracting means are magnetic means and the lids are ferromagnetic.

4. Apparatus as claimed in claim 3, wherein at an in-feed end of the second conveyor belt is situated a magnetic plate extending over the whole width of this second conveyor belt and having a strength such that all lids, irrespective of their orientation, are attracted thereby and carried along by the second conveyor belt.

5. Apparatus as claimed in claim 3, wherein the magnetic means comprise a pattern of magnets placed at regular mutual distances.

6. Apparatus as claimed in claim 5, wherein the magnets are embodied such that they generate a magnetic field displaying a strong attenuation with the distance to the magnet.

7. Apparatus as claimed in claim 6, wherein the surfaces of adjoining magnets facing toward the second conveyor belt have opposing orientations.

8. Apparatus as claimed in claim 7, wherein on their end remote from the second conveyor belt the magnets are coupled to a common ferromagnetic pole plate.

9. Apparatus as claimed in claim 7, wherein the magnets are substantially U-shaped in cross section.

10. Apparatus as claimed in claim 7, wherein the magnets are substantially W-shaped in cross section, wherein the middle leg has magnetic orientation opposed to the magnetic orientation of the outer legs.

11. Apparatus as claimed in claim 10, wherein the active end face of the magnet has a generally annular magnet pole enclosing a central magnet pole.

12. Apparatus as claimed in claim 5, wherein the mutual distances between the magnets are smaller than the relevant linear dimension of a lid.

13. An apparatus for orienting ferromagnetic lids each comprising a plate and a peripheral edge standing away therefrom, which apparatus comprises:

a first conveyor belt for supplying a disordered mass of ferromagnetic lids;

a second conveyor belt connecting thereto at the end thereof and inclining upward at an acute angle of between about 20 degrees and 80 degrees, wherein at an in-feed end of the second conveyor belt is situated a magnetic plate extending over the whole width of this second conveyor belt and having a strength such that all lids, irrespective of their orientation, are attracted thereby and carried along by the second conveyor belt, and behind an active part of said second conveyor belt are placed magnetic means which exert a sufficiently great attractive force on the plate to cause a lid to be carried along by the second conveyor belt but which exert an attractive force on the peripheral edge insufficiently great to cause a lid to be carried along by the second conveyor belt; and discharge means for removing from the second conveyor belt and further transporting the lids all with the same orientation.

14. The apparatus of claim 13, wherein said acute angle is between about 40 and 50 degrees.

15. An apparatus for orienting ferromagnetic lids each comprising a plate and a peripheral edge standing away therefrom, which apparatus comprises:

a first conveyor belt for supplying a disordered mass of ferromagnetic lids;

a second conveyor belt connecting thereto at the end thereof and inclining upward at an acute angle of between about 20 degrees and 80 degrees, behind an active part of which are placed magnetic means comprising a pattern of magnets placed at regular mutual distances wherein the surfaces of adjoining magnets facing toward the second conveyor belt have opposing orientations and said magnates are embodied such that said magnets generate a magnetic field displaying a strong attenuation with the distance to the magnet, and further such that said magnets exert a sufficiently great attractive force on the plate to cause a lid to be carried along by the second conveyor belt but which exert an attractive force on the peripheral edge insufficiently great to cause a lid to be carried along by the second conveyor belt; and discharge means for removing from the second conveyor belt and further transporting the lids all with the same orientation.

16. The apparatus of claim 15, wherein said acute angle is between about 40 and 50 degrees.

17. The apparatus of claim 15, wherein on their end remote from the second conveyor belt the magnets are coupled to a common ferromagnetic pole plate.

18. The apparatus of claim 15, wherein the magnets are substantially U-shaped in cross section.

19. The apparatus of claim 15, wherein the magnets are substantially W-shaped in cross section, wherein the middle leg has magnetic orientation opposed to the magnetic orientation of the outer legs.

20. The apparatus of claim 19, wherein the active end face of the magnet has a generally annular magnet pole enclosing a central magnet pole.

* * * * *